United States Patent
Balistierri et al.

(10) Patent No.: US 8,548,926 B2
(45) Date of Patent: Oct. 1, 2013

(54) METHOD AND APPARATUS FOR GLOBAL REPLACEMENT CARD SERVICES

(75) Inventors: Daniel F. Balistierri, Glastonbury, CT (US); Patricia Bateson, Brussels (BE); Alex Cunescu, Brussels (BE); Chris Lomax, Croughton (GB); Jan Lundequist, Brussels (BE); Dawn Pendel, St. Peters, MO (US)

(73) Assignee: Mastercard International Incorporated, Purchase, NY (US)

(*) Notice: Subject to any disclaimer, the term of this patent is extended or adjusted under 35 U.S.C. 154(b) by 0 days.

(21) Appl. No.: 13/085,989

(22) Filed: Apr. 13, 2011

(65) Prior Publication Data
US 2012/0047075 A1 Feb. 23, 2012

Related U.S. Application Data

(60) Provisional application No. 61/323,408, filed on Apr. 13, 2010.

(51) Int. Cl.
*G06Q 20/00* (2012.01)
(52) U.S. Cl.
USPC .......... 705/71; 705/64; 705/17; 705/39; 705/16; 235/379; 902/2; 713/183
(58) Field of Classification Search
USPC .......................................................... 705/71
See application file for complete search history.

(56) References Cited

U.S. PATENT DOCUMENTS

| | | | |
|---|---|---|---|
| 6,105,863 A | | 8/2000 | Jagadish et al. |
| 2002/0111919 A1* | | 8/2002 | Weller et al. ............ 705/67 |
| 2004/0236624 A1* | | 11/2004 | Di Luoffo et al. ........ 705/10 |
| 2009/0140041 A1 | | 6/2009 | MacGuire |
| 2009/0222367 A1* | | 9/2009 | Jenkins et al. ........... 705/35 |
| 2009/0228384 A1 | | 9/2009 | Melik-Aslanian et al. |

FOREIGN PATENT DOCUMENTS

| | | |
|---|---|---|
| JP | 2009164813 A * | 7/2009 |
| WO | WO 2008/107488 A1 | 9/2008 |

OTHER PUBLICATIONS

Smart Card Alliance, Security of Proximity Mobile Payments—A Smart Card Alliance Contactless and Mobile Payments Council White Paper. Publication Date: May 2009. Publication No. CPMC-09001. Retrieved online Jun. 3, 2013. http://www.smartcardalliance.org/resources/pdf/Security_of_Proximity_Mobile_Payments.pdf.*

Notification of Transmittal of the international Search Report (Forms PCT/ISA/220 and PCT/ISA/210) and the Written Opinion of the International Searching Authority (Form PCT/ISA/237) dated Oct. 31, 2011, issued in the corresponding International Application No. PCT/US2011/000669.

* cited by examiner

*Primary Examiner* — James A Reagan
(74) *Attorney, Agent, or Firm* — Buchanan Ingersoll & Rooney PC

(57) ABSTRACT

A prompt-response card issuing system providing temporary financial transaction cards includes a communications module, a personal account number (PAN) mapping module, and a security measure determination module. The communications module communicates with a plurality of financial card issuers, each having different profile standards for generating security measures, and also receives, from an issuer, an authorization for a new PAN associated with a financial account of a cardholder. The PAN module maps the new PAN to a temporary personal account number (TPAN) for the cardholder. The security measure determination module determines at least one security measure requirement according to a system profile standard of said prompt-response card issuing system rather than the system profile standard of the authorizing issuer. The TPAN, the security measure requirement, and personal information regarding the cardholder are communicated to a physical card producer so that a physical card bearing the TPAN, the security measure, and at least one item of personal information about the cardholder, can be produced and delivered to the cardholder.

16 Claims, 5 Drawing Sheets

METHOD AND APPARATUS FOR GLOBAL REPLACEMENT CARD SERVICES

CROSS REFERENCE TO PRIOR APPLICATIONS

This application claims the benefit of priority of provisional application No. 61/323/408 filed on Apr. 13, 2010, the entire content of which is hereby incorporated by reference.

FIELD OF THE INVENTION

The present invention relates to a system and method for providing a temporary card service. In particular, the present invention relates to the prompt issuance of a card that is linked to an existing financial account of a cardholder.

BACKGROUND OF THE INVENTION

In previous years, when a cardholder requested a replacement or temporary financial card, there were no minimum production or delivery standards that ensured any competitive or quality service levels. For example, card delivery to a cardholder often could take as all long as one week and could require cardholders to pick up their cards at inconvenient locations. As a more specific example, if a cardholder lost or misplaced his/her credit card while on an extended out of town trip, the cardholder would have had to have contacted his/her credit card company, canceled the credit card, and had another card issued. However, credit card companies mailed the replacement credit card to the mailing address associated with the cardholder that was on file with the credit card company, which, in most cases, was the primary residence of the cardholder. Therefore, the cardholder would not receive his/her card until returning home from his/her extended trip. Further, the card could typically take up to as long as a week to be delivered to the address on file and required activation from the telephone number that is also on file with the credit card company.

In most recent years, in order to improve production and delivery standards, MasterCard and some outsourcers (also referred to herein as "card providers") have provided temporary card services including 24-hour, toll-free, multilingual global customer service operations and guaranteed prompt delivery (e.g., next day delivery in some areas and 2-day delivery in other areas). However, as travel destinations have become more diverse, and security measure to prevent fraud have become more stringent, the ability to meet "emergency grade" delivery goals (e.g., one or two business days, as discussed above) have become strained. Furthermore, the advent of EMV chip, PIN, smart, and maestro cards in several markets has accelerated, causing increasing difficulty in the creation of replacement or temporary cards in addition to meeting acceptable delivery expectations. Moreover, currently, it is necessary for card providers to securely exchange, with card issuers, a number of cryptographic keys corresponding to the banks identification numbers (BINs). This process involves significant time and effort, and in some cases, involves systems developed by the card issuer, not the card provider.

As more capabilities are added to temporary card services, more cryptographic keys are required to be exchanged (e.g., Pin keys, CVV/CVC keys, Chip keys, EMV keys, etc.) between card providers and card issuers. Key exchange is already a significant overhead for issuers, and the temporary card services add additional overhead with the need to support more keys and customers.

Furthermore, it would be necessary to maintain a database of the cryptographic keys associated to all BINs (bank identification number) in order to identify the issuer of a card and to properly route authorization request messages over existing payment card networks. Maintaining such a database is virtually impossible as the number of financial institutions is boundless worldwide (e.g., 22,000+ card issuing banks).

Thus, a need exists for a prompt-response and secure card issuing system that provides temporary financial transaction cards having excellent global acceptance and offering the cardholder the same payment services as permanent financial transaction cards. A need also exists for a card issuing system that significantly reduces card issuer impact. A further need exists for a card issuing system that does not require key exchange with card issuers.

SUMMARY OF THE INVENTION

Systems and methods for providing prompt issuance of temporary cards are disclosed herein.

It is noted initially that, as used herein, the term "financial card" can include, for example, magnetic stripe bearing card, smart card, magnetic stripe and smart card combination, prepaid card, credit card, debit card, combination credit/debit card, Visa®, MasterCard®, American Express®, Diners Club, Discover® Card, merchant card, or any other card suitable for a cardholder to use to make purchases of goods and/or services. Also, as used herein, the terms "cardholder," "card user," and "card recipient" can be used interchangeably and can include any user making purchases of goods and/or services. Further, as used herein in, the term "issuer" or can include, for example, a financial institution (i.e., bank) issuing a card, a merchant issuing a merchant specific card, a stand-in processor configured to act on-behalf of the card-issuer, or any other suitable institution configured to issue a financial card.

One aspect of exemplary embodiments of the disclosed system for providing temporary financial transaction cards includes a communications module, a personal account number (PAN) mapping module, and a security measure determination module. The communications module is configured to communicate with a plurality of financial card issuers, wherein different issuers among the plurality of issuers have different profile standards for generating security measures. The communications module is further configured to receive from an issuer among the plurality of issuers an authorization for a new personal account number (PAN) associated with a financial account of a cardholder. The PAN mapping module is configured to map the new PAN to a temporary personal account number (TPAN) for the cardholder. The security measure determination module is configured to determine at least one security measure requirement according to a system profile standard of the prompt-response card issuing system rather than the system profile standard of the authorizing issuer. The system is configured to communicate the TPAN, the security measure requirement and personal information regarding the cardholder to a physical card producer so that the physical card producer can produce a physical card bearing the TPAN, the security measure and at least one item of personal information about the cardholder, and deliver the card to the cardholder.

Another aspect of exemplary embodiments of the disclosed system involves a method for providing temporary financial transaction cards. The system first receives from one of a plurality of financial card issuers, a new personal account number (PAN) associated with a financial account of a cardholder. The system then selects an available temporary personal account number (TPAN) for the cardholder and maps the selected temporary personal account number with the personal account number received from the card issuer. Cryptographic keys are provided for generating at least one security measure associated with the temporary personal account number according to a system profile standard of the provider of the temporary financial transaction cards rather than one of the plurality of financial card issuers. The system initiates the creation of a physical temporary card for delivery to the cardholder bearing the at least one security measure and the TPAN of the cardholder.

BRIEF DESCRIPTION OF THE DRAWING FIGURES

The exemplary embodiments of the disclosed system can be better understood with reference to the following drawings and description. The components in the figures are not necessarily to scale, emphasis instead being placed upon illustrating the principles of exemplary embodiments of the disclosed system. Moreover, in the figures, like reference numerals designate corresponding parts through the different views.

DETAILED DESCRIPTION OF THE INVENTION

The disclosed embodiments include a prompt-response and secure card issuing system that provides temporary financial transaction cards. The system includes a plurality of modules wherein at least one of the modules is configured to determine at least one security measure requirement according a prompt-response card issuing system profile standard such that the system does not require cryptographic key exchange with a plurality of card issuers.

Figure 1:
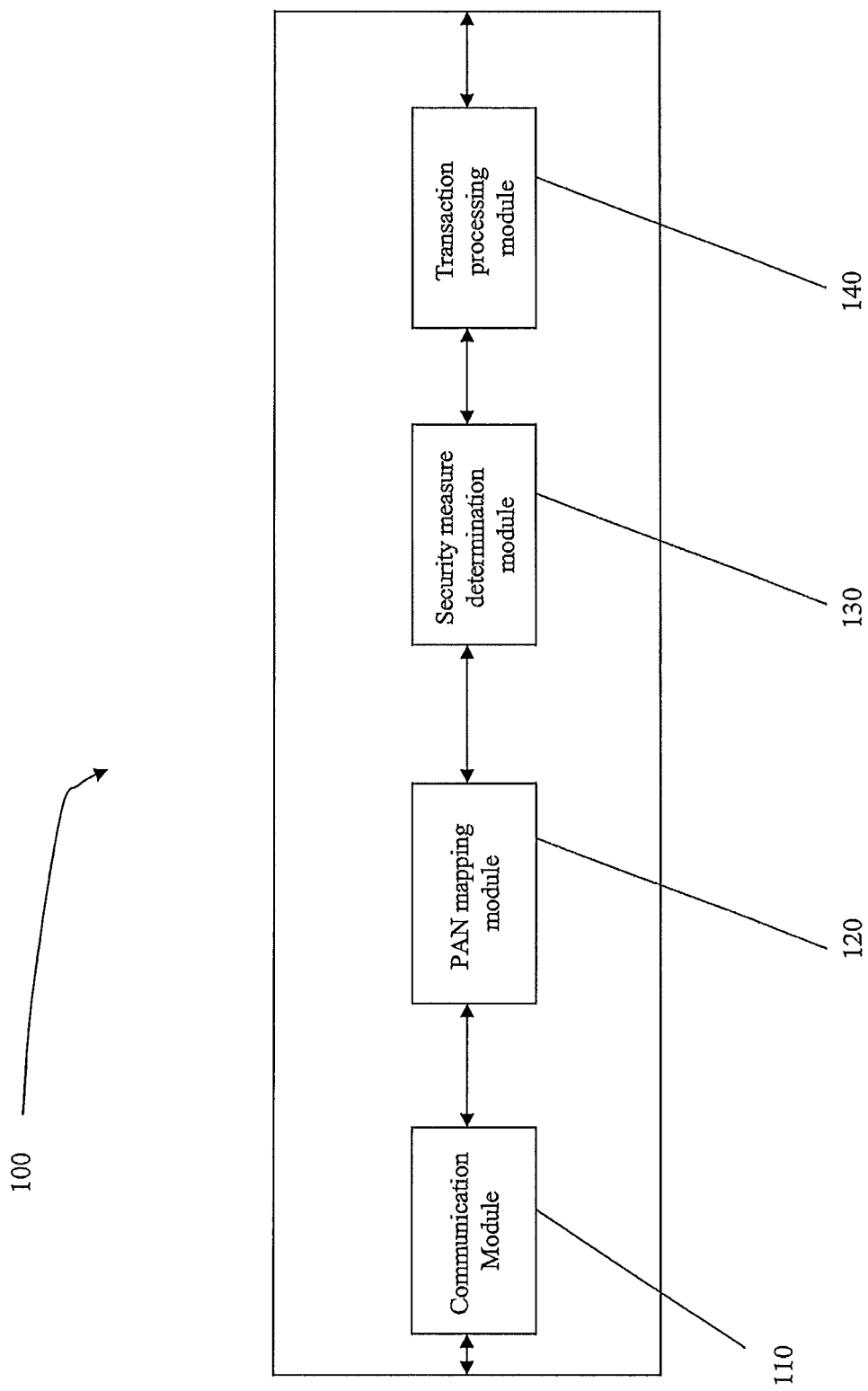
FIG. 1 illustrates a block diagram of a prompt-response card issuing system according to an embodiment of the disclosed system.

FIG. 1 illustrates a block diagram of a prompt-response card issuing system 100 according to an embodiment of the disclosed system. The system 100 includes a communications module 110, a personal account number (also referred to herein as "PAN") mapping module 120, a security measure determination module 130, and a transaction processing module 140.

The communications module 110 includes a processor (not shown) and a memory device (not shown). The memory device includes a database system (not illustrated) configured to store data relating to cardholders, card issuers, system generated unique bank identification numbers (BINs) and sub-BINs (discussed in more detail herein), which are created within the BINS (e.g., one for each country currency), and cryptographic key sets corresponding to each system generated BIN. The communications module 110 further includes an interface (not shown) configured to communicate with a plurality of card issuers and a plurality of cardholders, external to the system 100.

Figure 2:
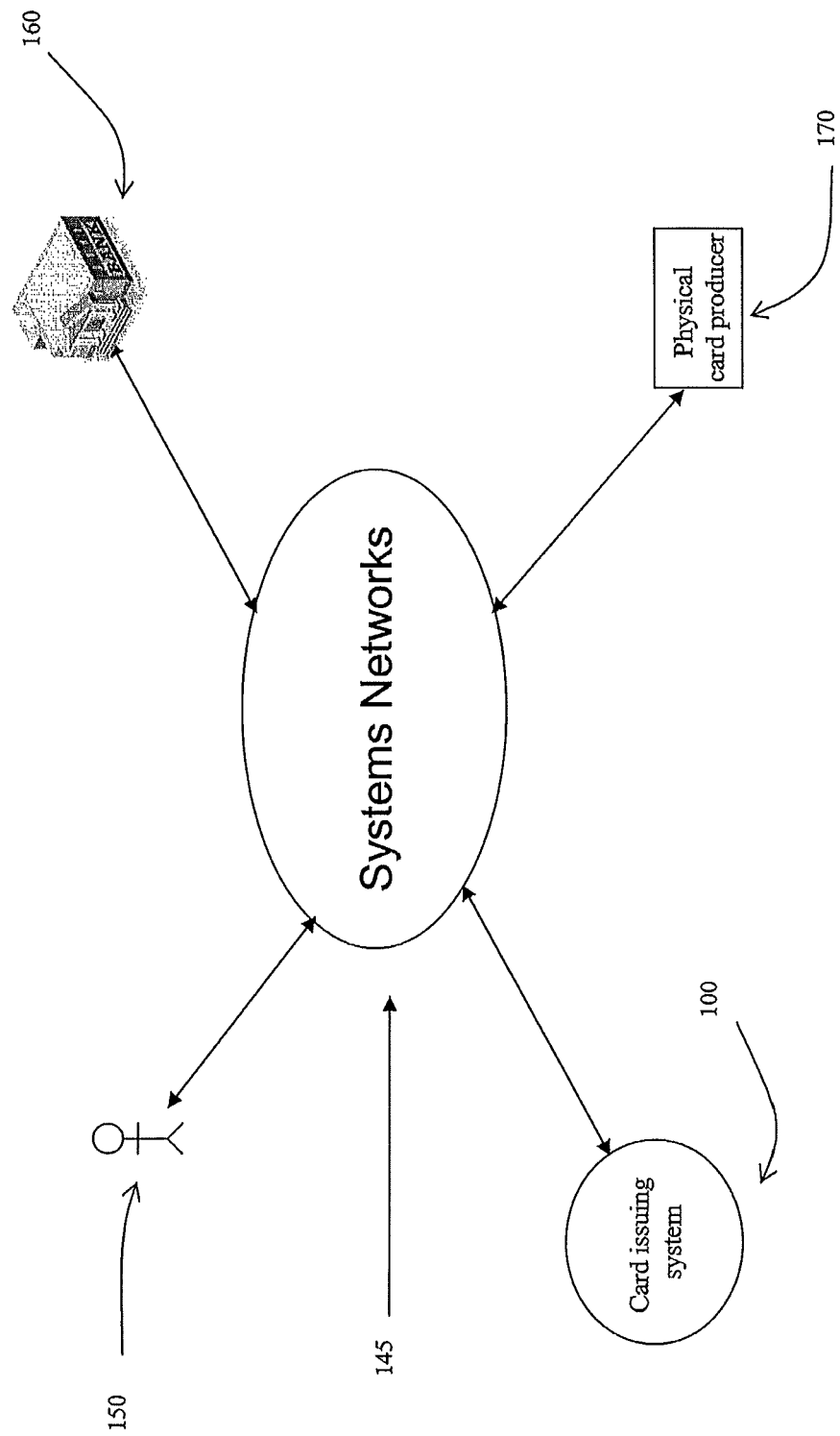
FIG. 2 is a diagram illustrating bi-directional communication of the prompt-response card issuing system of FIG. 1 with a plurality of parties external to the system.

The communications module 110 is configured to receive financial card requests from both financial card issuers 160 and cardholders 150 (shown in FIG. 2), to collect information relating to the cardholder 150, and to create a file including all information collected associated with the cardholder 150. The collected information relating to the cardholder 150 can include, for example, name, telephone number, address to which the card is to be delivered, and duration of stay at address (also referred to herein as "itinerary information"). For example, the communications module 110 can receive a request from a cardholder 150 for a replacement card due to a lost or stolen credit card and can collect contact/delivery information for prompt delivery of a replacement card.

The communications module 110 is further configured to receive authorization from the issuer 160 (shown in FIG. 2), to receive new account information from the issuer 160, and to initiate the creation of a temporary financial card for the cardholder 150. The new account information can include, for example, a new personal account number (PAN) associated with a financial account of the cardholder 150, an expiration date, activation information, etc. Further to the example above, the communications module 110 would communicate with the bank, informing the bank of the cardholder's lost or stolen credit card, request that new account information be created and shared with the prompt-response card issuing system 100, and request permission to create a temporary replacement card on behalf of the bank.

Furthermore, the communications module 110 is configured to communicate with a physical card producer (e.g., regional personalization center) 170, for producing a physical temporary card (described in more detail below), and a logistics services company (e.g., parcel delivery company) (not illustrated), for delivering the physical temporary card to the cardholder 150 at address provided at the time of the request. The communications module 110 of card issuing system 100 is configured to communicate with each of the cardholder 150, the issuer 160, the physical card producer 170, and the regional delivery company (not illustrated) via a plurality of systems networks 145. The plurality of networks 145 can include any software and hardware devices used to provide communication between applications/devices and can include any designs configured to enable the transfer of data (e.g., the Internet). Communication within the networks 145 can be performed via a wired or wireless based communication and can be any communication medium configured to transmit data.

The personal account number (PAN) mapping module 120 is coupled to the communications module 110 and the security measure determination module 130 and is configured to communicate with both the communication and security measure determination modules 110, 130, respectively. The PAN mapping module 120 is configured to receive, from the communications module 110, the file created including information relating to the cardholder 150.

The PAN mapping module 120 is configured to assign a temporary personal account number (TPAN) to the cardholder 150. In some embodiments, a TPAN is generated by the PAN mapping module 120 specifically for the cardholder 150. In other embodiments, a finite number of TPANs exists and can be recycled within the database system of the communications module 110 for a predetermined period of time.

The predetermined period of time can be any suitable amount of time in order to ensure certainty that a previous use of the TPAN has been cleared. In such embodiments, the PAN mapping module 120 selects an available TPAN (i.e., a TPAN not currently in use) from a pool of available TPANs and assigns it to the cardholder 150. The selection of the TPAN is based on PAN characteristics of the cardholder 150. The PAN characteristics can include, for example, card type, product type, country currency, etc., or any suitable combination thereof. The TPAN can also correspond to one of a plurality of global BINs and/or sub BINs generated by the system 100.

The PAN mapping module 120 is further configured to map the new PAN received from the issuer 160 at the communications module 110, as discussed above, to the temporary personal account number (TPAN) selected. Said another way, the PAN mapping module 120 electronically links the new PAN to the TPAN such that any transaction made to the temporary card will be linked to the new account issued by the issuer 160. Further to the example above, once the system 100 initiates the prompt delivery of the temporary replacement card to the cardholder 150, any future transactions made to that card will be linked to the new replacement credit card issued by the issuer 160.

The PAN mapping module 120 is further configured to update the cardholder's file to incorporate the TPAN information.

The security measure determination module 130 is coupled to the PAN mapping module 120 and the transaction processing module 140 and is configured to communicate between both the PAN mapping and transaction processing modules 120, 140, respectively. The security measure determination module 130 (e.g., operations module) is configured to receive, from the PAN mapping module 120, the updated file including cardholder's information.

The security measure determination module 130 is configured to determine and to append at least one security measure requirement according to a profile standard generated by the prompt-response card issuing system 100. More specifically, the at least one security measure requirement is specific to the prompt-response card issuing system 100 and is completely independent from a system profile standard associated with an issuer 160. The at least one security measure requirement can be cryptographic keys, algorithms, or the information for generating, for example, a CVV/CVC (card verification value code) requirement, a PIN (personal identification number) requirement, a EMV chip requirement (standard promulgated jointly by Europay International S.A., MasterCard® International Incorporated, and Visa International Service Association), Magnetic Stripe, etc., or any suitable combination thereof. The security measure determination module 130 is further configured to determine an appropriate system generated BIN/sub-BIN for the temporary card and any cryptographic keys associated with the security measures and/or selected BINs. The security determination module 130 is further configured to update the cardholder's file to incorporate the security requirement information.

The transaction processing module 140 is coupled to the security measure determination module 130 and is configured to perform verification and security authorization on transactions associated with the temporary financial card. Such authorization requests can be from, for example, a merchant, and are transmitted to and from the transaction processing module 140 of the system 100 rather than the issuer 160. Said another way, the transaction processing module 140 can "stand in" for or accept transactions "on-behalf of" the issuer 160. The generation of the system standard profile, including, for example, the system generated unique BINs and sub-BINs, the standard cryptographic key sets associated with the generated BINs, the security measures, etc., requires such "stand-in processing" or "on-half-of processing." Similar to above with respect to the generation of unique BINS, maintaining a database of interchange rates corresponding to each issuer would be virtually impossible as the number of financial institutions is boundless worldwide. The transaction processing module 140, therefore, in some embodiments, is configured to generate and employ a single standard interchange rate for all issuers in lieu of managing each and every interchange rate associated with all known issuers. Said another way, the generated single standard interchange rate is universally applied to all transactions conducted using the temporary financial card.

Figure 3A:
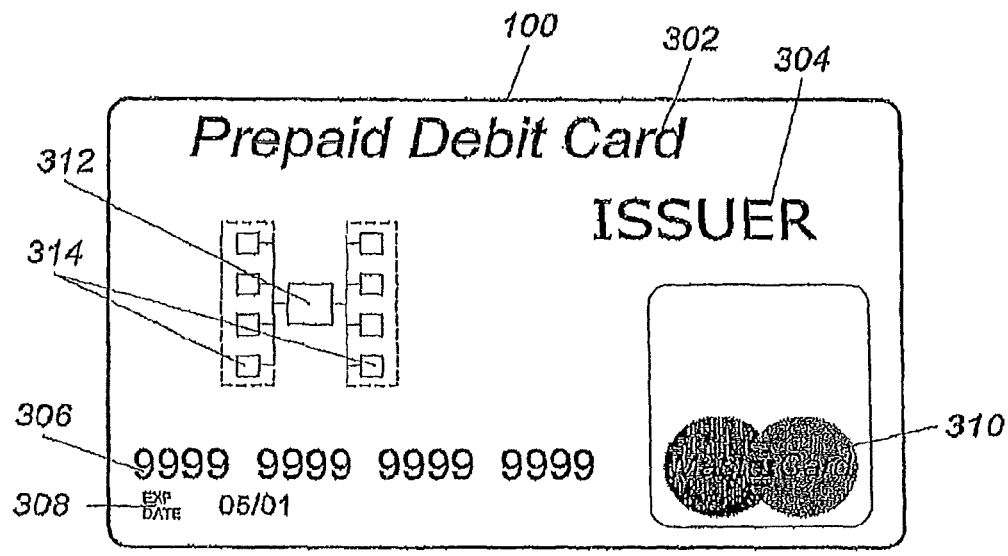
FIG. 3a illustrates an example of a temporary financial transaction card generated by the prompt-response card issuing system of FIG. 1.
Figure 3B:
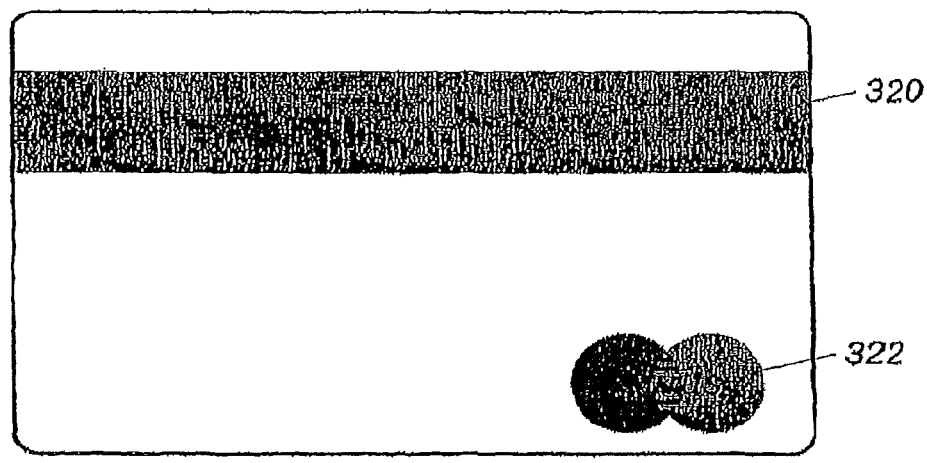
FIG. 3b is a schematic illustration of a back side of the exemplary temporary financial transaction card illustrated in FIG. 3a FIG. 3c is a schematic illustration of a temporary personal account number associated with temporary transaction card illustrated in FIGS. 3a and 3b.
Figure 3C:
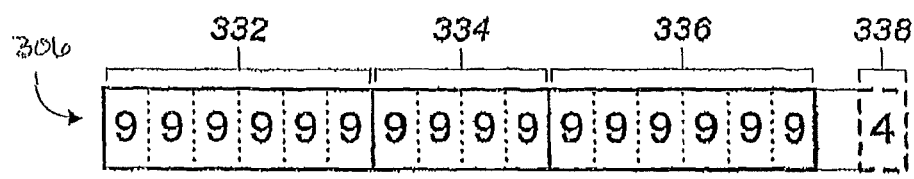

FIG. 3A-3C illustrates an exemplary embodiment of a temporary financial transaction card 300 that can be generated by the prompt-response card issuing system 100 of FIG. 1. The card 300, as illustrated in FIG. 3b, can include an integrated circuit (IC) chip 312, which includes a microprocessor and memory, and electrical contacts 314 for communicating between the chip 312 and devices external to the card 300. The chip is also configured to store the TPAN 306 and PIN (if available) within the memory.

In some embodiments, the front side of the card 300 is configured to identify the type of card, similar to conventional cards. A "Prepaid Debit card" 302 is shown strictly for illustrative purposes only. It should be understood that any suitable card type, as previously referenced, can be identified. For example, in some embodiments, "Credit Card" can be identified. In other embodiments "Diners Club" can be identified. In yet other embodiments, "Merchant Card" can be identified. The card 300 includes an issuer name 304, the cardholder's temporary personal account number (TPAN) 306, and the logo 310 of financial services (e.g., MasterCard®) accessed by the card 300. Although only one logo is illustrated, any suitable number of logos may appear on the face of the card 300. Alternatively, the card may appear unbranded. Other financial services accessible with the card 300 can include, for example, Maestro® POS purchase services and Cirrus® ATM services.

In some embodiments, the card 300 can include an expiration date 308. The expiration date of the temporary card 300 can be, for example, a date determined by the issuer. The expiration date 308, can also be determined, based on the duration of time the cardholder 150 is away from his/her primary address. The expiration date 308, therefore, can be any suitable date agreed upon by the issuer, the cardholder 150, and the prompt-response card issuing system 100.

The card 300 can also include the cardholder's name. However, in some embodiments, as in the embodiment illustrated in FIG. 3a, the front side of the card 300 does not necessarily need to illustrate cardholder's name.

FIG. 3b illustrates the back side of card 300 including a magnetic stripe 320. The Logo 322, for example, may appear on the back side of the card as well as the front side. Magnetic stripe 320 may be used in lieu of, or in addition to, chip 312. Magnetic stripe 320 is configured to store information including, for example, the TPAN 306 and information that, upon swiping the magnetic stripe 320 of the card through a merchant terminal, enables the terminal to connect to a processing center via modem or some other approved communications method.

FIG. 3c illustrates the TPAN 306 according, to an embodiment, which is stored on magnetic stripe 320. The TPAN 306 can include 16 to 19 digits in total. In the example illustrated in FIG. 3c, TPAN 306 includes a total of 17 digits. In this example, the first six digits 332 comprise system generated "BIN" which identifies the type of card. In this example, the type of card is a "Prepaid Debit Card" as shown, in FIG. 3a. The next four digits 334 are issuer ID numbers, which the prompt-response card issuing system 100 generates and assigns to specific issuers. This number facilitates in linking the funds associated with the card to the PAN issued by the issuer and associated with a financial account of a cardholder 150. The next five to eight digits 336 comprise a number of an account in which the balance associated with the card is stored. The final digit 338 comprises a check digit to verify the other 15-18 digits. Of course, the format can be different, this example being just one of many possibilities. In some embodiments the final digit 338 can include up to 3 digits. These digits are commonly referred to as the card's security code (i.e., CVV/CVC).

The TPAN 306, as previously described, is electronically linked to the new cardholder PAN provided by the issuer, such that when transactions are made via the temporary financial card, they are electronically linked to the account corresponding to the new TPAN. Said another way, the transactions are electronically transferred from the temporary account associated with the temporary card to the account corresponding to the new PAN provided by the issuer.

Figure 4:
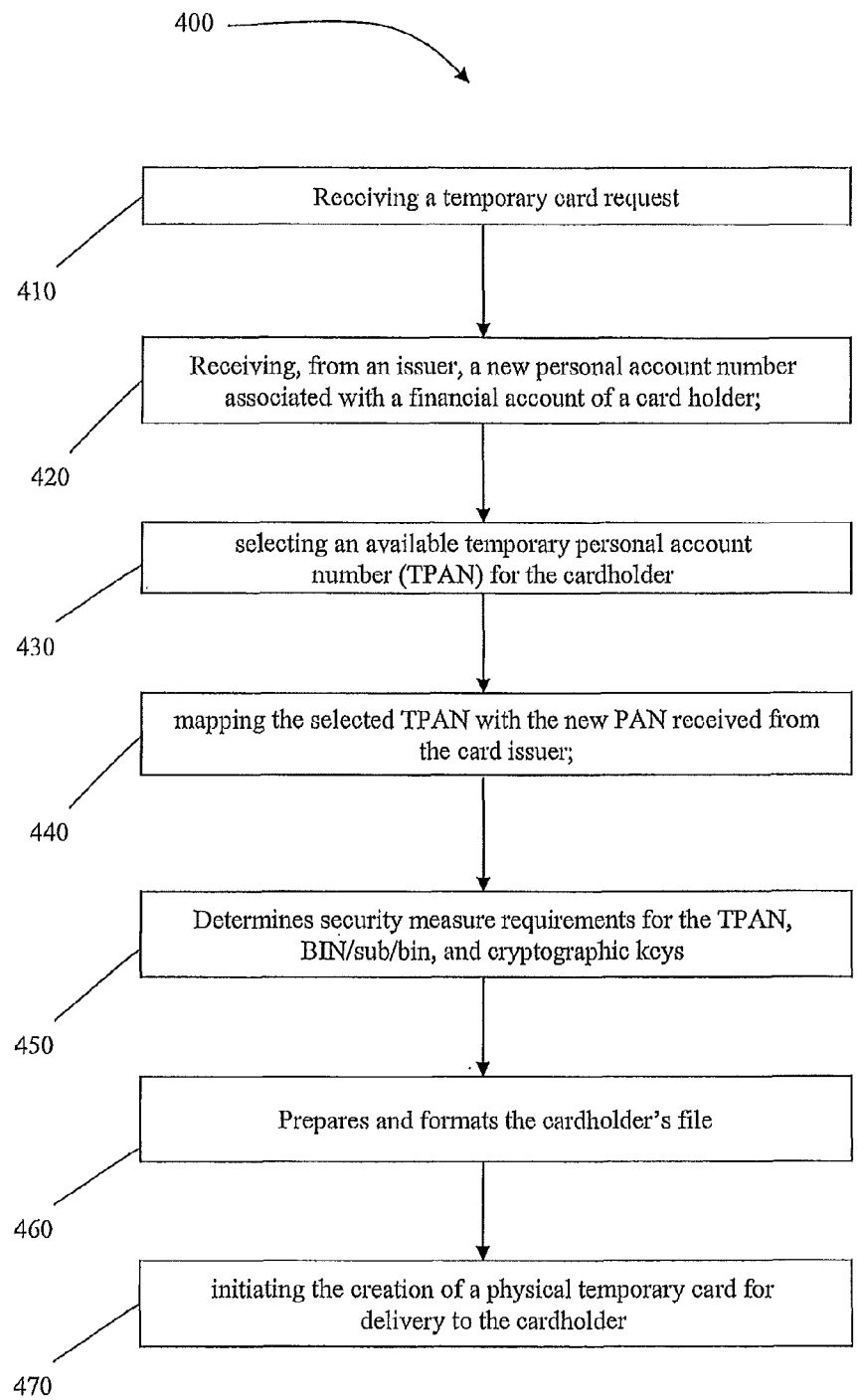
FIG. 4 illustrates a flow chart illustrating a method for issuing a temporary card via the prompt-response card issuing system of FIG. 1.
Figure 5:
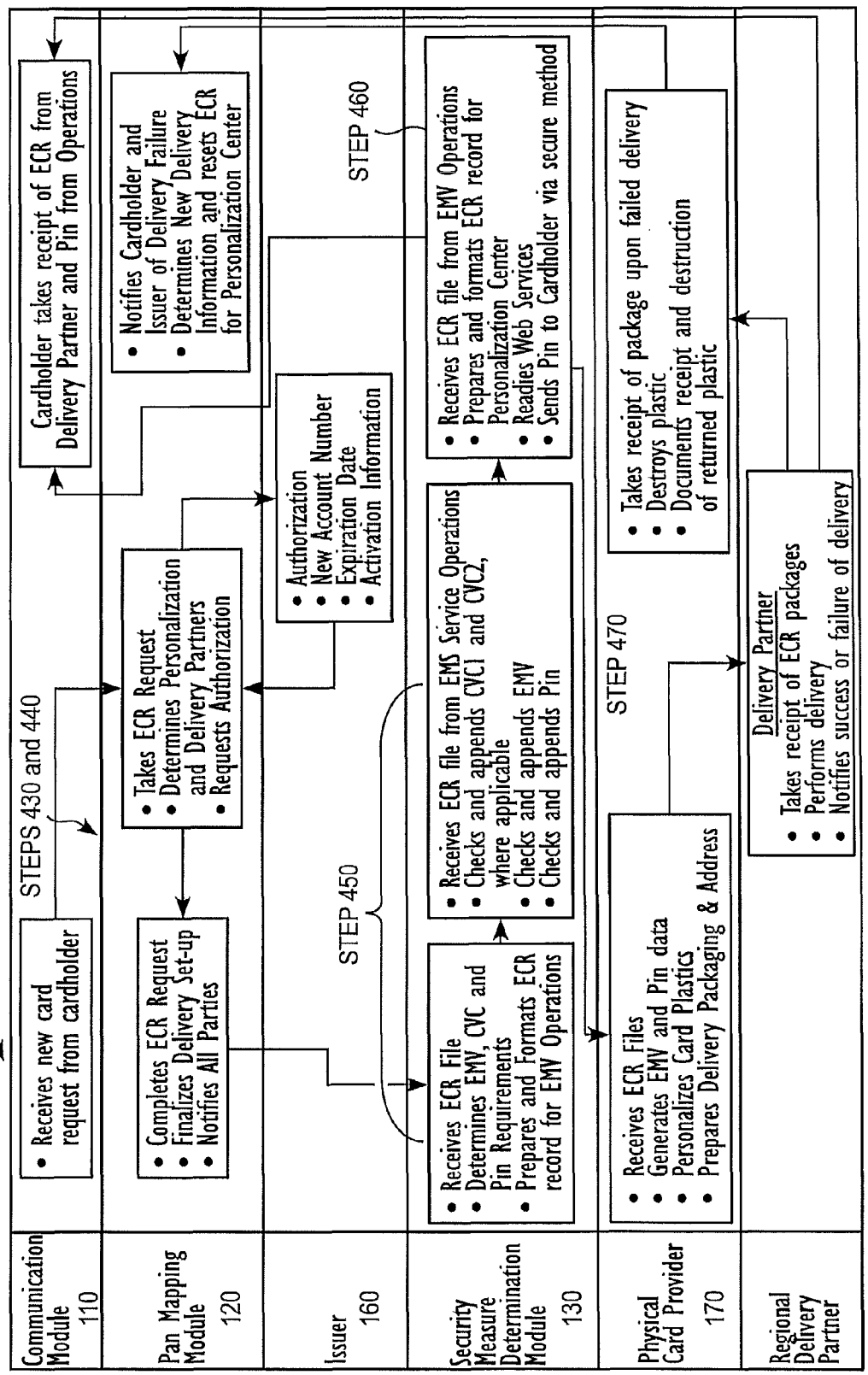
FIG. 5 is a workflow diagram illustrating communication between individual modules of the prompt-response card issuing system of FIG. 1 and the external parties of FIG. 2.

FIG. 4 and FIG. 5 illustrate a flow chart 400 and a workflow diagram 500, respectively. The flow chart 400 of FIG. 4 illustrates a method for issuing a temporary financial card via the prompt-response card issuing system 100 of FIG. 1, and the workflow diagram 500 of FIG. 5 illustrates communication between individual modules of the prompt-response card issuing system 100 of FIG. 1 and the external parties (e.g., cardholder 150, issuer 160, and physical card producer 170) illustrated and described with respect to FIG. 2.

At step 410, the communications module 110 receives a temporary card request from a cardholder and collects cardholder information. The card request can include, for example, a emergency replacement card (e.g., a cardholder has lost his/her card or the card has been stolen), a temporary card (e.g., cardholder requires a new financial card), or any request requiring prompt delivery of a temporary financial card. The collected information relating to the cardholder 150 can include, for example, name, telephone number, address to which the card is to be delivered, and duration of stay at address (also referred to herein as "itinerary information"). Itinerary information is especially important in the event that the cardholder 150 is on a business trip or a personal vacation and will be away from his/her primary residence for an extended period of time.

At step 420, the communications module 110 communicates with a card issuer to inform the issuer that the cardholder 150 has requested a temporary card. The communications module 110 requests that the issuer 160 open a new account for the cardholder 150 and requests authorization to open a temporary replacement card for the cardholder 150 on behalf of the issuer 160. Once authorization is granted, the communications module 110 transmits the cardholder's information collected at step 410 and receives, from the issuer 160, the new personal account information including, for example, the new personal account number (PAN) associated with the financial account of the cardholder 150, expiration date of the new account, activation information, etc. Depending on the physical location of the cardholder 150, the communications module 110 determines a physical card provider closest in proximity to the cardholder 150, as well as scheduling all delivery arrangements with a logistics services company (e.g., parcel delivery company) also of close proximity to the cardholder 150. For example, if the communications module 110 receives a temporary card request from a cardholder in Tokyo, Japan, the communications module 110 determines that a physical card provider with a location, for example, in Shanghai, China would be of closest proximity. The logistics services company of choice, could be, for example, any delivery partner specific to that region. Communication between the communications module 110 and the cardholder can be seen, for example, in FIG. 5, also illustrated by reference numbers 410 and 420. The cardholder information is stored in the database of the system 100 and is then sent to the PAN mapping module 120.

At step 430, the PAN mapping module 120 receives, from the communications module 110, the cardholder's information and assigns a temporary personal account number (TPAN) to the cardholder 150. As previously described, in some embodiments, a TPAN is generated by the PAN mapping module 120 specifically for the cardholder 150. In other embodiments, an available TPAN (i.e., a TPAN not currently in use) is selected and assigned to the cardholder 150. At step 440, the new PAN, received from the issuer at step 420, is mapped (i.e., electronically linked) to the temporary personal account number (TPAN) selected, such that any transaction conducted using a card with the selected TPAN will be linked to the new account issued by the issuer. Upon linking the TPAN to the PAN, the PAN mapping module 120 updates the cardholder file to incorporate the TPAN information and transmits the updated information to the security measure determination module 130. Communication between the PAN mapping module 120 and the communications module 110 can be seen, for example, in FIG. 5, also illustrated by reference numbers 430 and 440.

At step 450, the security measure determination module 130 receives from the PAN mapping module 120, the cardholder's updated information including the new TPAN, and determines and appends at least one security measure requirement for the TPAN according to a profile standard generated by the prompt-response card issuing system 100. The security measure requirements can include, for example, a CVV/CVC 1 and CVV/CVC 2 requirements, a PIN requirement, an EMV chip requirement, Magnetic Stripe, etc., or any suitable combination thereof. The security measure determination module 130, also at step 450, determines an appropriate BIN/sub-BIN for the temporary card and any cryptographic keys associated with the security measures and/or selected BINs.

At step 460, the security determination module 130 prepares and formats the cardholder's file. Method steps 450 and 460 are also illustrated in FIG. 5.

At step 470, the security measure determination module 130 initiates the creation of a physical temporary card for delivery to the cardholder 150 by communicating via the communications module 110. The system 100 transmits the cardholder's file to a physical card producer 170 (e.g., personalization center) so that a physical card bearing the TPAN, the security measures determined, and information pertaining to the cardholder 150 (e.g., name) can be created and delivered to the cardholder 150 at the location given upon request of the temporary card. Communication between the system 100 and the physical card producer 170 is also illustrated in FIG. 5 with like reference numbers.

The previous description of the various embodiments is provided to enable any person skilled in the art to make or use the invention recited in the accompanying claims of the disclosed system. While exemplary embodiments of the disclosed system have been particularly shown and described with reference to embodiments thereof, it will be understood by those skilled in the art that many variations, modifications and alternative configurations may be made to the invention without departing from the spirit and scope of exemplary embodiments of the disclosed system.

For example, although the system 100 is disclosed and illustrated as being configured to receive temporary card requests from a cardholder, in some embodiments, system 100 is configured to receive a request from a card issuer (e.g., financial institution). Said another way, an issuer can communicate with the communications module 110 of the system 100 to inform the system 100 that a temporary card needs to be issued.

For example, although the expiration date 308 is disclosed as being a date agreed upon by the card issuer, the cardholder, and the system, in some embodiments, the expiree of the temporary card can correspond to the activation of the new card issued by the card issuer. Said another way, since the TPAN and the new PAN are electronically linked, activation of the new card (e.g., activation via telephone, via internet, etc.) would automatically cancel/expire the temporary card.

For example, although the physical card producer 170 is disclosed and illustrated as being a separate entity (e.g., external to) of the prompt-response card issuing system 100, in some embodiments the physical card producer 170 can be part (e.g., internal to) of the system 100.

For example, although the PAN mapping module 120 and said security measure determination module 130 are separate entities, in some embodiments, the PAN mapping module 120 and the security determination module 130 can be under common control. In other embodiments, the PAN mapping module 120 and the security determination module 130 can be under separate control.

Incorporated herein by reference are U.S. Pat. Nos. 7,593, 896; 7,571,142; and 7,567,934, all by Flitcroft, et al., and entitled "Credit Card System and Method;" and Appendix A consisting of Intellectual Property Disclosure form for "Enhanced Global Acceptance ECR Service" (4 pages); EMV ECR Workflow (1 page); and memo entitled "Primer" (4 pages).

While various exemplary embodiments of the disclosed system have been described above, it should be understood that they have been presented by way of example only, and not limitation. Where methods described above indicate certain events occurring in certain order, the ordering of certain events may be modified. Thus, the breadth and scope of exemplary embodiments of the disclosed system should not be limited by any of the above-described embodiments but should be defined only in accordance with the following claims and their equivalents.

What is claimed is:

1. A prompt-response card issuing system for providing temporary financial transaction cards, the system comprising:
   a communications module configured to (i) communicate with a plurality of financial card issuers, wherein different issuers among said plurality of issuers have different profile standards for generating security measures, and (ii) receive from an issuer among said plurality of issuers a new personal account number (PAN) associated with a financial account of a cardholder;
   a PAN mapping module configured to map the new PAN received from the issuer to a temporary personal account number (TPAN), assigned by the system, for the cardholder;
   a security measure determination module to determine at least one security measure requirement according to a system profile standard of said prompt-response card issuing system rather than the system profile standard of the authorizing issuer; wherein
   said TPAN, said security measure requirement and personal information regarding the cardholder are communicated to a physical card producer so that said physical card producer can produce a physical card bearing said TPAN, said security measure and at least one item of personal information about the cardholder, for delivery to said cardholder.

2. The system according to claim 1, further comprising a transaction processing module to provide at least one of stand-in processing and on-behalf-of processing of financial transactions as a stand-in or on behalf of the authorizing issuer.

3. The system according to claim 2, wherein at least one of said stand-in processing and said on-behalf-of processing employs a single standard interchange rate for all issuers among said plurality of issuers.

4. The system according to claim 1 wherein the TPAN corresponds to characteristics of the new PAN of the cardholder, said characteristic including at least one of a card type, product type, country, and currency.

5. The system according to claim 1 wherein the TPAN corresponds to one of a plurality of system generated global BINs and sub-BINs.

6. The system according to claim 1 wherein said at least one security measure requirement includes cryptographic keys of said prompt-response card issuing system rather than one or more cryptographic keys of the authorizing issuer, to generate at least one of CVC, PIN and EMV.

7. The system according to claim 1 wherein said PAN mapping module and said security measure determination module are separate entities under common control.

8. The system according to claim 1 wherein said a physical card producer is a regional personalization center that is a separate entity from said prompt-response card issuing system.

9. The system according to claim 1 wherein said physical card producer is part of said prompt-response card issuing system.

10. The system according to claim 1 wherein said physical card producer ships a physical card to said cardholder at a location the cardholder is expected to be at the expected time of delivery.

11. A method for providing temporary financial transaction cards, comprising the steps of:
    receiving from one of a plurality of financial card issuers, a new personal account number (PAN) associated with a financial account of a cardholder;
    selecting an available temporary personal account number (TPAN) for the cardholder;
    mapping the selected temporary personal account number with the personal account number received from the card issuer;
    providing cryptographic keys for generating at least one security measure associated with the temporary personal account number according to a system profile standard of the provider of the temporary financial transaction cards rather that one of the plurality of financial card issuers; and
    initiating the creation of a physical temporary card for delivery to the cardholder bearing the at least one security measure and the TPAN of the cardholder.

12. The method according to claim 11, wherein the TPAN corresponds to one of a plurality of system generated global BINs and sub-BINs.

13. The method according to claim 11, wherein the TPAN corresponds to characteristics of the new PAN of the cardholder, said characteristic including at least one of a card type, product type, country, and currency.

14. The method according claim 11, wherein said at least one security measure requirement includes cryptographic keys of said prompt-response card issuing system rather than one or more cryptographic keys of the authorizing issuer, for generating at least one of CVC, PIN and EMV.

15. The method according claim 11, further comprising at least one of stand-in processing and on-behalf-of processing of financial transactions as a stand-in or on behalf of the authorizing issuer.

16. The method according claim 15, wherein at least one of said stand-in processing and said on-behalf-of processing employs a single standard interchange rate for all issuers among said plurality of issuers.

* * * * *